United States Patent [19]

Nabha et al.

[11] Patent Number: 5,081,565
[45] Date of Patent: Jan. 14, 1992

[54] DAYTIME RUNNING LIGHT SYSTEM

[75] Inventors: Ali M. Nabha, Dearborn; Michael C. Long, Sterling Heights, both of Mich.

[73] Assignee: Chrysler Corporation, Highland Park, Mich.

[21] Appl. No.: 610,675

[22] Filed: Nov. 8, 1990

[51] Int. Cl.⁵ .............................................. B60Q 1/00
[52] U.S. Cl. ....................................... 362/61; 362/802; 340/469; 315/82; 307/10.8
[58] Field of Search ............................ 362/61, 80, 802; 340/468, 469; 315/82, 83; 307/10.8

[56] References Cited

U.S. PATENT DOCUMENTS

| | | | |
|---|---|---|---|
| 3,021,449 | 2/1962 | Kerr et al. | 362/80 |
| 3,039,020 | 6/1962 | Sargent | 362/61 |
| 3,040,207 | 6/1962 | Grontkonski | 362/361 |
| 3,704,446 | 11/1972 | Walter | 340/468 |
| 3,798,460 | 3/1974 | Taheda et al. | 362/80 |
| 3,832,597 | 8/1974 | Mitchell | 362/80 |
| 3,832,597 | 8/1979 | Mitchell | 307/10.8 |
| 4,185,268 | 1/1980 | Sakakibora | 362/80 |
| 4,841,199 | 6/1989 | Irie | 315/82 |
| 5,030,884 | 7/1991 | Roussey et al. | 307/10.8 |

Primary Examiner—Ira J. Lazarus
Assistant Examiner—Sue Hagarman
Attorney, Agent, or Firm—Wendell K. Fredericks

[57] ABSTRACT

A daytime running light system employs level sensing comparators to effect reduced illuminating the high beam filaments of headlamps of a vehicle and short circuit protection to the circuit as well as to a high beam indicator circuit which only operates when the high beam filaments operate at full intensity.

7 Claims, 3 Drawing Sheets

DAYTIME RUNNING LIGHT SYSTEM

BACKGROUND OF THE INVENTION

1. Field of the Invention:

The present invention relates generally to novel lamp illuminating apparatus and in particular to daytime running lights for motor vehicles.

2. Description of Background Art:

U.S. Pat. No. 4,684,819 of Haag et al. dated Aug. 4, 1987 entitled "Vehicle Daytime Running Lamps" teaches supplying power to the high beam filaments through a field-effect transistor that is modulated by an oscillator operating at a frequency sufficient to maintain the headlights at a constant reduced intensity. This system uses NAND logic, an SCR and discrete components to achieve features such as turning the high beam indicator OFF during operation of the daytime running lights. Such arrangement appears to provide adequate control of the high beam indicator but there may be a problem associated with short circuits across the indicator lamp during ignition turn-on or when a filament of the indicator shorts.

SUMMARY OF THE INVENTION

This daytime running light system, using comparators, a conventional transistor, a smart high side FET and supporting discrete components provides a reduced intensity light source from high beam filaments of vehicle headlamps for daytime illumination whenever an operator, with a headlamp switch in an "OFF" position, releases a vehicle park brake and then moves an ignition switch to a "RUN" position from an "OFF" position.

This reduced intensity occurring after an approximate 1.5 second delay results from a pulse width modulated (PWM) signal pulsing a high beam filament of the headlamps at a frequency of about 100 Hz.

Also, the present invention provides short circuit protection for the high beam filaments of the headlamps as well as the high beam indicator within the instrument compartment of the motor vehicle.

IN THE DRAWINGS

Figure 3:
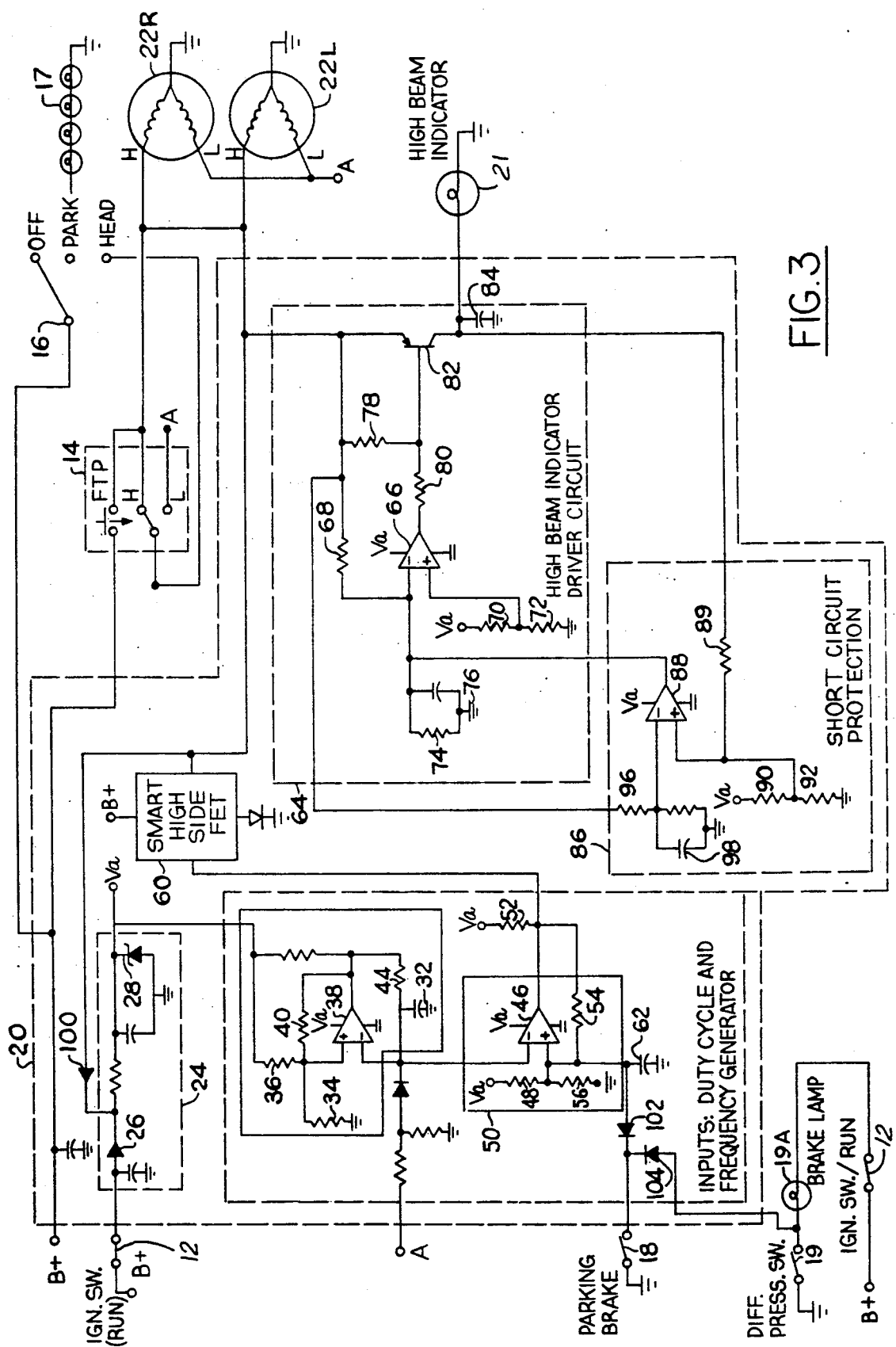

FIG. 3 illustrates a detailed schematic diagram of a daytime running light module of system 10; and FIG. 4, 5, 6 and 7 are waveforms of input and output signals of a triangular waveform generator 30, a square-wave generator 50, and a high beam indicator driver circuit 64.

DETAILED DESCRIPTION OF A PREFERRED EMBODIMENT

Figure 1:
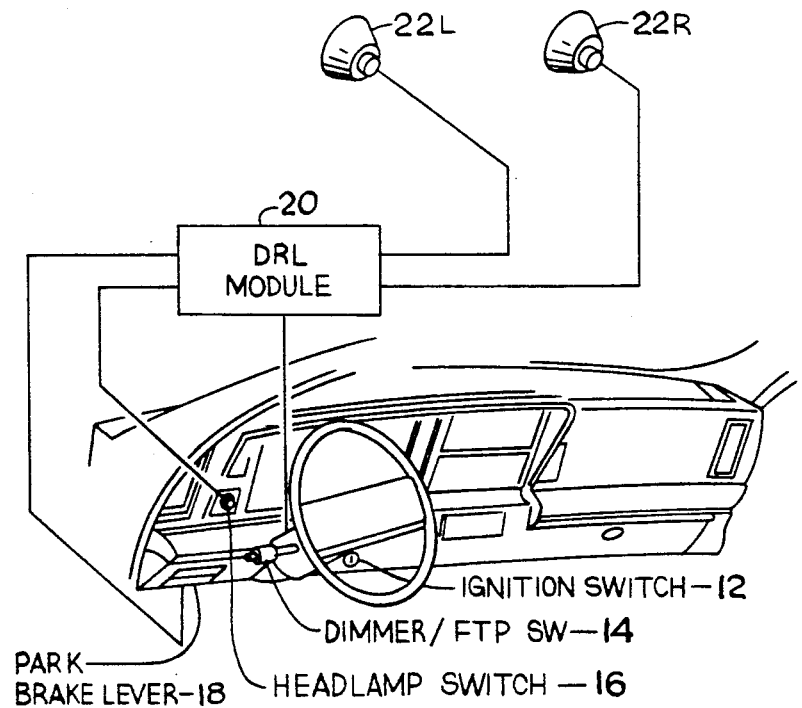
FIG. 1 illustrates in a partial pictorial, partial schematic diagram, a daytime running light system 10.

FIG. 1 illustrates, in a partial pictorial, partial schematic diagram, a daytime running light system 10 that includes a daytime running light module (DRL) 20.

A PARK BRAKE lever 18 set to ON or a head lamp switch 16 set to HEAD in conjunction with a DIMMER and FLASH-TO-PASS (DIM/FTP) switch 14 on the steering column stalk set to LOW disables DRL 20. A DIFFERENTIAL PRESSURE switch 19 (not shown) set to ON due to a fluid pressure drop occurring in the front or rear brake hydraulic circuit will light a warning lamp 19A but will not disable DRL 20. Setting PARK BRAKE lever 18 t OFF with IGNITION switch 12 set to RUN operates DRL 20. Illustratively, when DRL 20 operates a 100 Hz pulse width modulated (PWM) signal to lamps 22L and 22R reduces high beam filament illumination for daytime use.

Figure 2:
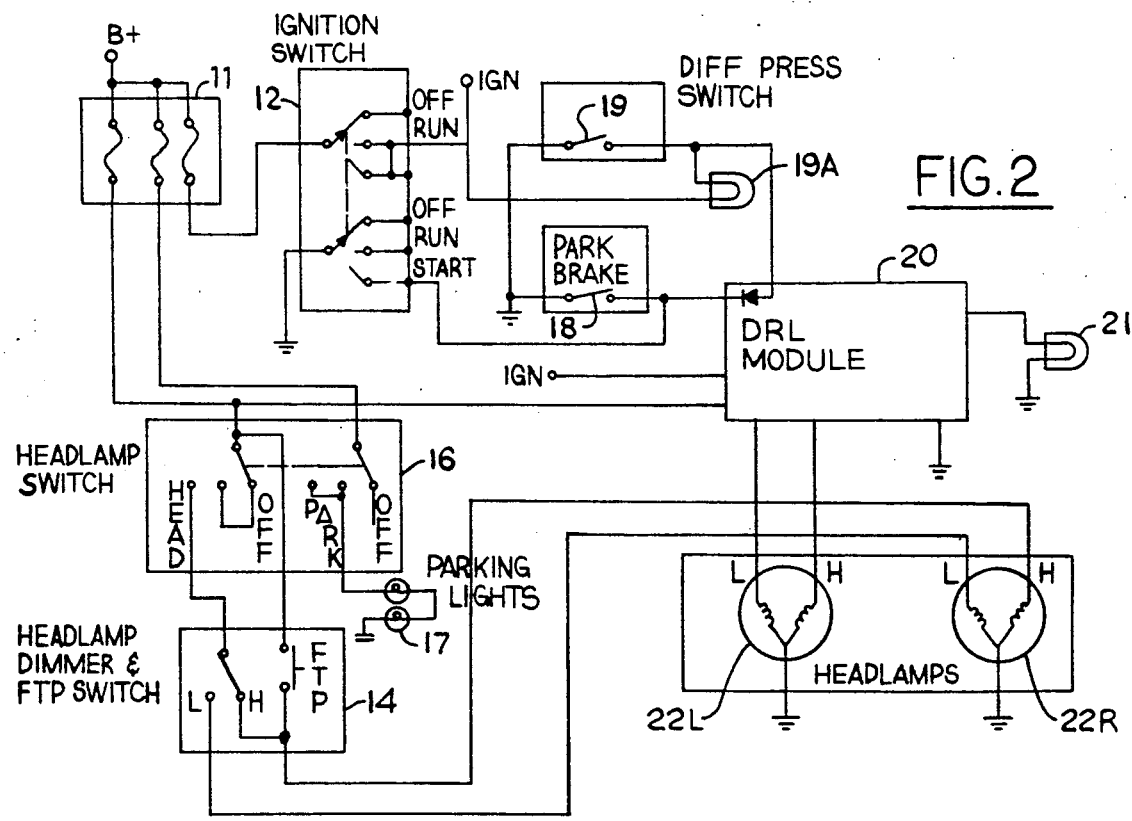
FIG. 2 depicts a schematic diagram of the daytime running light system.

FIG. 2 depicts a schematic diagram of system 10 which emphasizes the switches and power signals associated with DRL 20.

Battery voltage (B+), with an average current of 5 amps and which may peak at 40 amps, enters system 10 through a fuse block 11 and routes to a high voltage side of ignition switch 12, headlamp switch 16 and to a bus internal to DRL 20.

B+ entering ignition switch 12 becomes ignition voltage, a power signal, at an output terminal when turning ignition switch 12 from OFF to a RUN or START position. The ignition voltage supplies power to DRL 20 and to circuits associated with operation of DRL 20.

B+ entering headlamp switch 16 provides power to the headlamps 22L and 22R when placing headlamp switch 16 in the HEAD position with headlamp dimmer and FTP switch 14 in either a LOW or HIGH beam position. B+ also routes to a FTP pushbutton of switch 14 for flashing the high beam filaments. A high beam indicator light 21 illuminates to indicate the operation of the high beam filaments but does not illuminate during daytime running light operations.

Battery return or ground provide signals used by system 10 for completing operations of the logic and switching circuits.

THE DRL CIRCUIT

As mentioned supra, by releasing the parking brake switch 18 and turning ignition switch 12 to RUN activates DRL 20. Ignition voltage through the RUN terminal of switch 12 routes to a decoupling and bypassing filter network 24. In network 24, diode 26 provides full tolerance to transients on the ignition voltage line and reduces positive transients as well. Diode 26 also protects against inadvertently reversed battery connections. Zener diode 28 prevents the ignition voltage line from rising too high. Illustratively, a 27-volt zener diode 28 will highly resist any short circuit 60-volt transients on the ignition voltage line. It will also withstand connecting a 24-volt battery to B+, which often occurs during emergency starting. At the output of network 24, a stable reference voltage (Va) results. This reference voltage supplies all analog and digital devices in DRL 20.

TRIANGULAR WAVEFORM GENERATOR

A Schmitt trigger type circuit 30 including a level detecting comparator 38 with direct current (DC) hysteresis, i.e., positive feedback added to improve the performance of electrical switching, generates, illustratively, a 100 Hz triangular waveform used by DRL 20 to develop the PWM signal associated with reducing illumination of the high beams during daytime running operations.

The level detecting comparator 38 yields an open output when the voltage at a (+) input terminal exceeds the voltage at a (−) input terminal and yields a grounded output when the opposite voltages appear at the two inputs. A voltage divider connects to the (+) input terminal while an RC integrator connects to the (−) input terminal. When an open output appears at comparator 38, the voltage divider places at the (+)

input of comparator 38 a divided output voltage of about ⅔Va; and when a grounded input appears the voltage divider places at the (+) input, a divided output of about ⅓Va.

Illustratively, resistors 34 and 36 at 100 Kilohms, and resistor 42 at 6.2 Kilohms form the voltage divider network with resistor 40 at 100 Kilohms adding positive feedback. Resistor 44 at 100 Kilohms and capacitor 32, at 0.068 uF form the RC integrator.

A voltage of ⅔Va, enters the (+) terminal of comparator 38 due to the voltage divider action of essentially parallel resistors 36 and 42 in series with resistor 34 as shown in equation 1.

$$Va \cdot \frac{R34}{R34 + (R36 \| R40)} = Va \cdot \frac{100K}{150K} = 2/3\ Va \quad (1)$$

An exponentially rising voltage applies to the (−) terminal of comparator 38 resulting from capacitor 32 charging to ⅔Va during a first time constant through resistors 42 and 44.

Equation 2 describes the charging voltage on capacitor 32 seen at the (−) terminal of comparator 38 and the time it takes for the potential difference at the (−) terminal of comparator 38 to equal the voltage at the (+) terminal.

$$V_c \tfrac{2}{3} Va = \tfrac{1}{3} + (Va - \tfrac{1}{3} Va)(1 - \epsilon^{-t/RC})$$

where
$R = R42 + R44$ and
$C = C32$ $$\tfrac{2}{3} = \tfrac{1}{3} + \tfrac{2}{3}(1 - \epsilon^{-t/RC})$$

$$2\epsilon^{-t/RC} = 1$$

$$\epsilon^{-t/RC} = \tfrac{1}{2}$$

$$-t/RC = \ln \tfrac{1}{2}$$

$$t = RC \cdot \ln 2 = 106.2 \times 0.068 \times 0.69\ ms$$

$$t = 5\ ms \quad (2)$$

During this first time constant and as the potential difference across capacitor 32 reaches that across the (+) terminal, comparator 38 triggers and the output terminal of comparator 38 goes to a ground potential.

The reference voltage at the (+) terminal changes to ⅓Va since resistors 34 and 40 become parallel resistors in series with resistor 36.

Equation 3 depicts the new reference voltage.

$$\text{reference voltage} = Va \frac{R34 \| R40}{R34 \| R40 + R36} \quad (3)$$

$$= Va \frac{50K}{50K + 100K} = 1/3\ Va$$

This triggering causes capacitor 32 to stop charging and to start discharging asymptotically through resistor 44 toward the ground potential until the potential difference across capacitor 32 reaches approximately ⅓Va.

Equation 4 shows the discharge voltage of capacitor 32.

$$Vd = \tfrac{2}{3} Va \cdot \epsilon^{-t/(R44 \cdot C32)}$$

$$\tfrac{1}{3} Va = \tfrac{2}{3} Va \cdot \epsilon^{-t/(R44 \cdot C32)}$$

$$1 = 2\epsilon^{-t/(R44 \cdot C32)}$$

$$\tfrac{1}{2} = \epsilon^{-t/(R44 \cdot C32)}$$

$$\ln \tfrac{1}{2} = -t/(R44 \cdot C32)$$

$$-\ln 2 = -t/(R44 \cdot C32)$$

$$t = R44 \cdot C32 \cdot \ln 2$$

$$t = 100K \cdot 0.068\ uF \cdot \ln 2$$

$$t = 100K \cdot 0.068 \times 0.69$$

$$t = 4.7\ ms$$

$$period = 5\ ms + 4.7\ ms = 9.7\ ms \quad (4)$$

When the reference voltage exceeds the triggering voltage, the output of comparator 38 switches to a High potential. This High potential at the output causes capacitor 32 to a recharge again toward ⅔Va.

This cycle repeats at a rate of about 100 Hz. Hence, a 100 Hz triangular waveform signal results at the (−) terminal of comparator 38.

Figure 4:
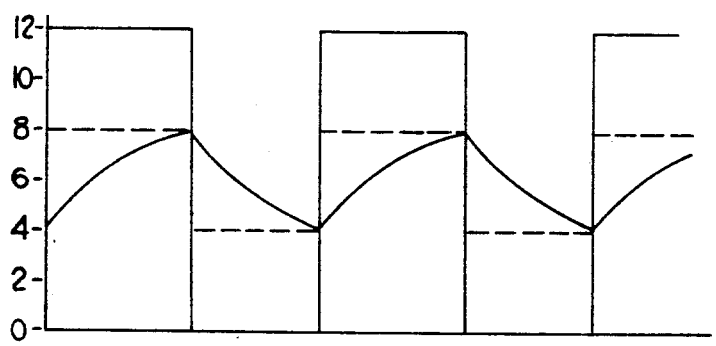
Figure 5:
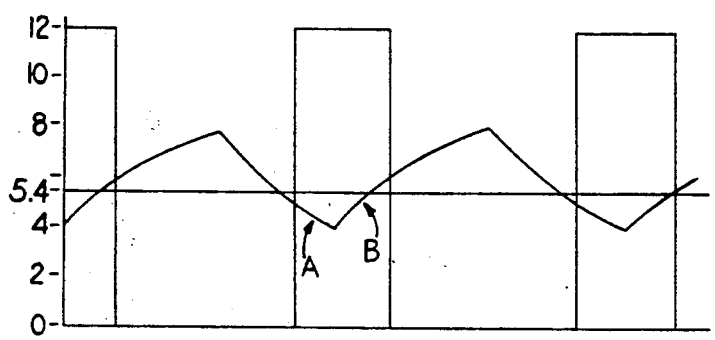

FIG. 4 depicts the output, the reference and trigger voltage input signals of comparator 38.

SQUAREWAVE GENERATOR

A smart high side field effect transistor 60 drives the high beam filaments of headlamps 22L and 22R in response to a 100 Hz squarewave signal from a squarewave generator circuit 50. A range of duty cycle of the square wave signal can be achieved by varying the value of resistor 56.

A (−) terminal of a comparator 46 of circuit 50 receives the triangular waveform generated by circuit 30. Illustratively, with resistor 48 at 330 Kilohms, resistor 56 at 270 Kilohms, resistor 62 at 6.2 Kilohms and capacitor 62 at 4.7 uF, a reference voltage of about 9/20 Va applies to a (+) terminal of comparator 46 after an initial time delay of 1.551 seconds cause by the RC time circuit of resistor 48 and capacitor 62. Resistors 48, 58 and 56 form a voltage divider between Va and ground which applies the 9/20 Va to the (+) terminal of comparator 46. This arrangement provides a duty cycle of about 36%.

Each time the amplitude of the triangular waveform from circuit 30 drops down to at least 9/20 Va at the (−) terminal of comparator 46, the output of comparator 46 goes High. When the ID amplitude of the triangular waveform exceeds 9/20 volts, the output of comparator 46 goes Low. Hence a squarewave output signal exits comparator 46 having a duty cycle equal to the On time divided by the period time 100 of the comparator output.

Equation 5-8 shows the detailed calculation of the 36% duty cycle of the square wave signal generated by circuit 50.

Equation 5 shows the voltage at the (+) terminal of comparator 46.

Equation 6 shows the discharging of capacitor 32 along curve A of FIG. 8.

Figure 6:
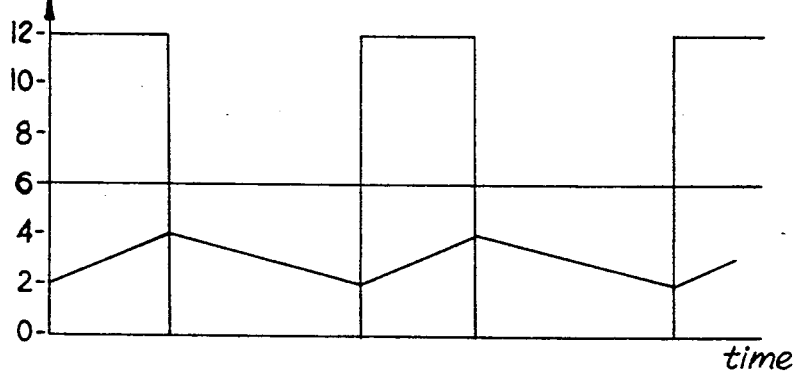

Equation 7 shows the charging of capacitor 32 along curve B of FIG. 6. The duty cycle is calculated by dividing the ON time by the period multiplied by 100.

Terminal of computer 46

$$V_t = \frac{R56}{R56 + R48} Va \quad (5)$$

-continued $$V_t = \frac{270}{270 + 330} Va$$

$$V_t = \frac{270}{600} Va = 9/20\ Va = 9/20\ (12) = 27/5 = 5.4$$

Discharging along curve A $$\tfrac{1}{3}Va = 9/20\ Va\ \epsilon^{-t/RC}$$

$$20/27 = \epsilon^{-t/RC}$$

$$-t/RC = \ln 20/27$$

$$t = -Rc \ln 20/27 = 2.04\ \text{ms} \tag{6}$$

Charging along curve B $$9/20\ Va = \tfrac{1}{3}Va + \tfrac{2}{3}Va\ (1 - e^{-t/RC})$$

$$t = 1.39\ \text{ms} \tag{7}$$

$$T_{on} = 2.04 + 1.39\ \text{ms} = 3.43\ \text{ms} \tag{8}$$

$$\%\ \text{duty cycle} = \frac{3.43}{9.7}\ (100) = 35.36\%$$

If headlamp switch 16 is placed in the HEAD position while the dimmer/FTP switch 14 is in the "L" position, B+ will apply to the low beam filament of headlamp 22R and 22L and to the (−) terminal of comparator 38 of the triangular waveform generator 30 and comparator 46 of the square wave generator 50. The B+ at these (−) terminals cause the output of both comparators to go to LOW or ground and remain grounded until the B+ is removed.

The low output of comparator 46 inhibits the operation of the smart HIGH side FET 60.

If PARKING BRAKE switch 18 is closed, a ground applies to the cathode of diode 102 which, in turn, places the anode and the (+) terminal of comparator 46 at 0.7 volts DC. The voltage at the (−) terminal will oscillate between, illustratively $\tfrac{1}{3}Va$ and $\tfrac{2}{3}Va$ volts. Hence, the output of comparator 46 will go to ground which also inhibits the operation of FET 60.

If the differential pressure switch 19 is closed, the DRL 20 is not affected. This occurs because diode 104 will be reversed biased which inhibits any influence on DRL 20 from the ground potential.

This 100 Hz signal drives FET 60 which in turn drives the high beam filaments of headlamps 22R and 22L. In a preferred embodiment, a 10 amp high side FET model No. BUK 196 of Philips Components Division of Slaterville, Rhode Island serves as FET 60.

HIGH BEAM INDICATOR DRIVER CIRCUIT

A high beam indicator driver circuit 64 operates to inhibit the high beam indicator light 21 when DRL 20 operates yet turns ON light 21 when the high beam filaments receive power through high beam switch 14.

When DRL 20 operates, illustratively, resistors 70 and 72 at 10 Kilohms provide a reference signal to a (+) terminal of a comparator 66 of circuit 64 of $\tfrac{1}{2}Va$.

Circuit 64 receives the output signal from comparator 46 of the squarewave generator circuit 50 via the output of FET 60 as an input signal used to trigger High and Low the output of comparator 66 when DRL 20 operates. Illustratively, a High output signal (12 VDC) from the output of FET 60 causes capacitor 76 (0.33 uF) to charge through resistor 68 (200K) to produce an increasing exponential voltage at a (−) terminal of comparator 66. Before this increasing voltage equals the reference voltage, the output of FET 60 opens. The output of comparator 66 will also open. Thus a base terminal of a PNP transistor 82 will open cutting the transistor and the high beam indicator OFF.

With the output of FET 60 open, capacitor 76 discharges to ground through resistor 74 and also through resistor 68 and the high beam filaments of high beam lamps 22R and 22L.

Before capacitor 76 discharges completely, the output of FET 60 goes High starting another cycle of recharging capacitor 76. As long as DRL 20 operates cycles of charging and discharging of capacitor 76 continues, the rate of charging equaling the rate of discharging. Hence the potential difference across capacitor 76 remains below the voltage at the (+) terminal of comparator 66. As long as the potential difference at the (+) terminal of comparator 66 remains above the potential difference across capacitor 76, the output of comparator 66 will remain open. Thus the base terminal of transistor 82 will be open inhibiting the operation of transistor 82 which in turn keeps the high beam indicator OFF.

Figure 7:
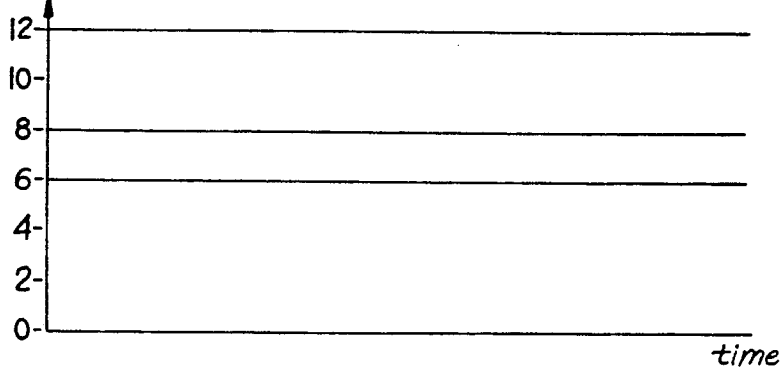

If the high beam switch 14 is turned ON, DRL 20 is overridden and the high beam indicator lamp 21 illuminates. This results because capacitor 76 will charge to a potential about $\tfrac{2}{3}$ of the B+, the potential of the voltage placed across the high beam filaments by switch 14, through resistor 68. The (−) terminal of comparator 66 will see the $\tfrac{2}{3}$B+ potential, which is a potential greater than the potential seen by the (+) terminal, hence the output of comparator 66 will go to a ground potential. This ground potential at the output of comparator 66 will turn ON transistor 82 which will then turn ON the high beam indicator 21. FIGS. 6 and 7 depict the waveforms associated with comparator 66 for inhibiting and for illuminating indicator 21 respectively.

AUXILIARY HIGH BEAM INDICATOR TURN ON

Occasionally, the operator would want to turn on the high beam filaments of headlamps 22L and 22R with the ignition switch in the OFF position. To turn ON the high beam indicator lamp 21 when this occurs, a substitute source of power must replace the stable reference voltage Va needed to supply power to the triangular waveform generator circuit 30, the squarewave generator circuit 50 and the high beam indicator driver circuit 64 needed for supplying power to lamp 21.

With the headlamp switch 16 in the HEAD position, B+ to routes through the dimmer/FTP switch 14 positioned to turn on the high beams to light the high beam filaments.

To generate the substitute source for Va, B+ routes through diode 100 which rectifies the B+ and makes available to DRL 20 an equivalent Va voltage for all the circuits receiving Va voltage.

SHORT CIRCUIT PROTECTION CIRCUIT FOR HIGH BEAM INDICATOR DRIVER CIRCUIT

A short circuit protection circuit 86 protects DRL 20 from short circuit voltages cause by a shorted filament or external wiring of the high beam indicator lamp 21. Resistor 89 couples the input side of lamp 21 to a (+)

terminal of a comparator 88 to sense the presence of a shorted filament of lamp 21.

With the ignition switch 12 and the high beam switch 14 OFF, the collector of transistor 82 is ground through the filament of the high beam indicator 21. Hence the voltage at the (+) terminal of comparator 88 is also ground since Va is not present. The (−) terminal is also essentially at ground. Therefore, on these initial conditions, circuit 86 is not operating.

The instant the high beam switch 14 is turned ON, applying B+ to the high beam filaments, the collector of transistor 82 is grounded through the filament of the high beam indicator 21 because of the parallel combination of resistors 89 and 92 in series with resistor 90 (illustratively, each of these resistors is 100K), the (+) terminal of comparator 88 is ⅓Va and capacitor 98 is at zero volt since it is shorted to ground. Therefore the output of comparator 88 is open. Hence circuit 64 is inhibited from operating until capacitor 98 exponentially charges to a final voltage of ⅓Va. During that time, transistor 82 will be in a saturation mode and the collector will be at B+, thus the parallel combination of resistors 89 and 90 in series with resistor 92 will switch the potential at the (+) terminal of comparator 88 to ⅔Va. This action will cause the output of comparator 88 to open. After these initial conditions, if a short occurs, the (+) terminal of comparator 88 will see ⅓Va which is less than the ½Va potential at the (−) terminal. Thus the output of comparator 88 will be grounded which in turn causes the output of comparator 66 to open and therefore cut off transistor 82.

REVERSE BATTERY WARNING

The high beam lamps will illuminate warning the operator that the battery is connected and the system is in the reversed direction. Diode 106 will protect FET 60 while diode 26 will protect the remainder of the circuits of DRL 20.

I claim:

1. A daytime running light system furnishing a reduced intensity light source mode automatically with respect to a full intensity mode from high beam filaments of a vehicle headlamp, after a chosen delay period following releasing a PARK BRAKE lever and turning an ignition switch from OFF to ON and without using a headlamp switch to turn ON the vehicle high beam headlamps, said high beam headlamps illuminating in the full intensity mode when operating the headlamp switch to a HEAD lamp position in conjunction with a headlamp dimmer and flash-to-pass (FTP) switch operated to a HIGH beam position, a high beam indicator lamp being driven ON when said high beam filaments operate in the full intensity mode but being held OFF when said high beam lights operate in the reduced intensity light source mode; said system comprising:
   a) means for delaying turn ON of said reduced intensity light source mode of the high beam filaments in response to turning ON said ignition switch and then releasing said PARK BRAKE lever;
   b) means for generating a triangular waveform signal from a stable voltage source initiated by turning ON said ignition switch;
   c) squarewave generating means coupled to said triangular waveform generating means for generating a squarewave signal of a chosen duty cycle;
   d) high beam filament driver mean for illuminating the high beam filaments in the reduced intensity light source mode in response to said squarewave signal from said squarewave generating means;
   e) high beam indicator driver means for holding said high beam indicator OFF when said high beam filaments are driven in the reduced intensity light source mode and for illuminating said indicator when the headlamp switch and the headlamp dimmer and FTP switch are operated to illuminate the high beam filaments in the full intensity mode; and
   f) short-circuit protection circuit coupled between an input and an output of said high beam indicator driver means for inhibiting operation of said indicator driver means when a shorted high beam filament or shorted external wiring of said high beam indicator exist.

2. Apparatus in accordance with claim 1 wherein said triangular waveform generator means includes:
   a) a voltage divider network having a first input terminal connected to receive forward current from said stable voltage source during a first time interval to produce an upper value reference voltage and a second input terminal connected to receive return current of a ground potential of said voltage source during a second time interval to produce a lower value reference voltage and an output terminal for alternately providing a bistable output voltage window between said upper voltage reference when said first input terminal receives current from said stable voltage source and said lower voltage reference when said second input terminal receives said return current;
   b) a first integrator means having an input connected to said second input of said voltage divider network for receiving forward current from said stable voltage source as said current passes by passes said second input terminal of said voltage divider network, said current causing a capacitor of said integrator means to exponentially charge towards a potential difference of said stable voltage source at a time constant dependent upon a chosen resistor of said voltage divider network in series with a resistor of said first integrator means during the first time interval, said exponentially charging potential difference being available at an output terminal of said first integrator means;
   said input of said integrator means also being connected to said second input terminal of said voltage divider means for routing asymptotically discharging current to the ground potential during the second time interval at a time constant dependent upon the resistor and capacitor of said integrator means; and
   c) a first level detecting comparator means having a (+) input terminal connected to said output terminal of said voltage divider and a (−) input terminal connected to said output terminal of said RC integrator for producing an open output when the voltage at the (+) input exceeds the voltage at the (−) input and for producing a ground output when the opposite input voltages exists;
   said first comparator making available at the (−) input terminal a positive slope voltage when said RC integrator charges and a negative slope voltage when said RC integrator discharges, said positive and negative slope voltages forming a triangularly shaped waveform of a chosen frequency.

3. Apparatus in accordance with claim 2 wherein said squarewave generating means includes a second level detecting comparator means having a (−) input terminal connected to the (−) input terminal of said first comparator means for receiving said triangularly shaped waveform and a (+) input terminal connected to a combination time delay and voltage divider circuit that places a reference voltage at the (+) input after a chosen time delay for producing at an output of said second comparator means, a HIGH output signal when an amplitude of the triangular waveform exceeds the reference voltage at the (+) input terminal and a LOW output signal when the amplitude of the triangular waveform falls below the reference voltage, forming a squarewave output signal of a chosen frequency; said squarewave output signal being used to drive a smart high side field effect transistor, which in turn drives with a second output squarewave signal, the high beam filaments to produce the daytime running light.

4. Apparatus in accordance with claim 3 wherein said high beam indicator driver means include a third level detecting comparator means having a (+) input terminal receiving a reference voltage of about ½ the stable source voltage and a (−) input terminal connected to an output of a second RC integrator means charged and discharged in response to oscillations of the second squarewave signal from said field effect transistor (FET) for producing an open output as long as the output of the FET is not overridden by a manual operation of the high beam light switch, the overriding of the FET output causing an amplitude at the (−) input of the third comparator to exceed that at the (+) input terminal causing a grounded output signal, said grounded output signal biases a conventional transistor ON which in turn lights the high beam indicator.

5. Apparatus in accordance with claim 4 wherein a fourth level sensing comparator means has a (−) input terminal connected to a combination voltage divider and a third RC integrator which charges and discharges a capacitor of the third integrator between ground and to about ½ the stable source voltage in response to the oscillations of the second squarewave signal and having a (+) input terminal connected to a voltage divider circuit which provides a upper reference voltage to the (+) input terminal if a collector output of the conventional transistor is grounded and a lower reference voltage to the (+) input if the collector is at the source voltage potential, the upper reference voltage being above the amplitude of the voltage at the (+) input terminal and the lower reference voltage being below the amplitude of the voltage at the (+) terminal, the receipt of the lower reference voltage causing a grounded output of the fourth comparator means to cutoff base bias to the conventional transistor protecting it from a short circuit signal from the high beam indicator and the receipt of the lower reference voltage causing the output of the fourth comparator means to provide an open output which does not interfere with biasing circuits of the conventional transistor which lights the high beam indicator lamp.

6. Apparatus in accordance with claim 1 wherein an auxiliary stable power source provides power to the system when the high beam filaments of the headlamps are turn ON when the ignition switch is OFF.

7. Apparatus in accordance with claim 1 wherein the high beam filaments will illuminate to alert the operator if a reverse source voltage is applied to the daytime running light system while short circuit and load dump protection circuits protect components of the system from reverse voltages and shorts to ground.

* * * * *